(No Model.)
J. F. McLAUGHLIN.
SECONDARY BATTERY ELECTRODE.
No. 427,785. Patented May 13, 1890.
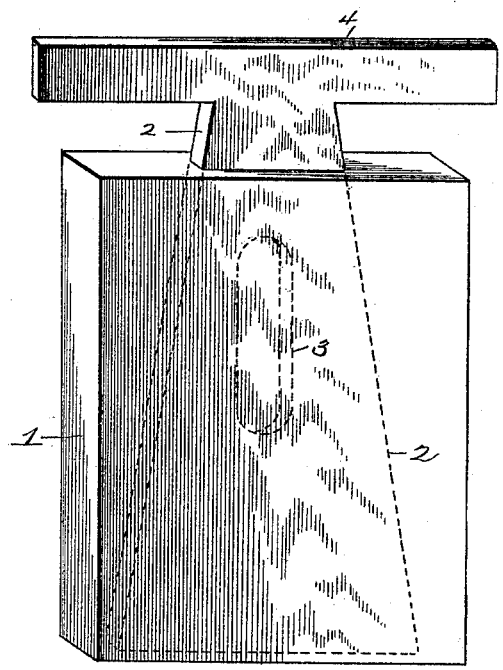
Witnesses:
J. B. McGirr.
F. T. Chapman
Inventor
James F. McLaughlin,
By Joseph Lyon
Attorney.

UNITED STATES PATENT OFFICE.

JAMES F. McLAUGHLIN, OF PHILADELPHIA, PENNSYLVANIA.

SECONDARY-BATTERY ELECTRODE.

SPECIFICATION forming part of Letters Patent No. 427,785, dated May 13, 1890.

Application filed March 17, 1890. Serial No. 344,183. (No model.)

*To all whom it may concern:*

Be it known that I, JAMES F. MCLAUGHLIN, a citizen of the United States, and a resident of Philadelphia, in the county of Philadelphia and State of Pennsylvania, have invented certain new and useful Improvements in Secondary-Battery Electrodes, of which the following is a specification.

My invention has reference to improvements in secondary-battery electrodes, whereby the same are specially adapted for use in connection with electric-motor cars, although they are equally adapted for stationary secondary batteries.

Secondary-battery electrodes have heretofore been made by mixing red oxide of lead, litharge, or other like compounds containing oxide of lead with plaster-of-paris and water. The mixture thus produced was afterward run into molds and solidified under pressure. The electrodes thus produced have the disadvantage that when used in the secondary battery the peroxide of lead and also the metallic lead formed on its surfaces during the process of forming, charging, and discharging would detach themselves from the electrode and would fall down to the bottom of the containing-vessel in the form of fine flakes, which would soon cover the whole bottom, and would eventually short-circuit the battery by bridging the lower ends of the electrodes; but irrespective of this short-circuiting effect the disintegration of the electrode constituted a serious defect of the battery, requiring frequent insertion of new electrodes, so that the benefits which a solid plate of active material promised became illusive.

I have discovered that the disintegration of a secondary-battery electrode thus made is due to the fact that the oxide of lead when mixed with plaster-of-paris and water does not intimately and forcibly adhere to the particles of plaster-of paris, and I have found by repeated and long-continued experiments that if in this old process of making secondary-battery electrodes the water or a portion of it is replaced by sulphuric acid the oxide of lead is converted into a cement, which closely unites with the plaster-of-paris, so that these two ingredients are held together with great tenacity. I am not prepared to say whether or not this union is of a chemical nature or whether it is merely that surface action of one substance upon another which is ordinarily described as "adhesion;" but I know that whatever the nature of the union of the substances may be it is of such kind that the electrode produced will not deteriorate in the manner described with reference to the electrode where oxide of lead and plaster-of-paris are merely mixed with water, and I have also found that in my process the substitution of an inert substance—such as pumice-stone or carbon—for the plaster-of-paris at once so changes the electrode that it will deteriorate in the manner described. I am, for this reason, inclined to believe that the alkaline character of plaster-of-paris adds to the beneficial qualities of the electrode.

In my electrode the peeling off either of peroxide of lead or of metallic lead is practically avoided. Even after long-continued use of the battery no disintegration of the electrode is perceptible, and no deposit appears upon the bottom of the containing-jar.

Secondary-battery electrodes when made in accordance with my process may assume a great variety of shapes. They may be simple sticks or rods, which may afterward be clamped to or otherwise connected with the leading-wires; or they may be made in the shape of extended plates having a conducting-core embedded, which core may then serve as the leading terminal of the electrode.

In the accompanying drawings I have shown a perspective view of one preferred form of my improved electrode; but it will be understood that I am by no means confined to that form, or, in fact, to any particular form, my invention being, broadly, an electrode composed of the materials entering into the process which I have adopted for making the same.

In making the body of my secondary-battery electrode I take oxide of lead, either in the form known as "red lead," or I may use litharge or any other compound containing a very large percentage of oxide of lead; but the so-called "red oxide of lead" is the material which I prefer, and I mix the same in a dry state with well-powdered plaster-of-paris. I have found that seventy-five per cent. of red lead mixed with twenty-five per cent. of plaster-of-paris gives the best result, although other proportions may be used without deviating from the fundamental idea of my invention. The two dry powders, after they have been well mixed, are placed in a vessel containing either the ordinary sulphuric acid found in the market, or the sulphuric acid may be somewhat diluted with water, and so much of the liquid is used as will make, with the red lead and plaster-of-paris, an emulsion which will still flow spontaneously after having been well mixed. This emulsion is then poured into a mold having the counterpart of the shape of the desired electrode, and is allowed to set and harden.

I may or may not employ pressure in the molding of the electrode, and in either case after a few hours the emulsion has solidified into a compact mass, having the appearance of a red brick, and when struck with a hard object produces a clear ringing sound. The cake, plate, or rod thus produced constitutes the body of my improved electrode, and has the characteristics of durability hereinbefore described.

As stated above, the shape of the electrode may vary, and the form shown in the drawing is one of the innumerable shapes it may assume.

The body of the electrode is represented in the drawing as a parallelopiped or prism 1, having a core 2, of lead or other suitable conductor, centrally embedded within its mass. This core 2 is shown in the drawing as tapering or wedge-shaped, with a perforation 3 in the middle and a head 4 at its upper end for supporting the electrode upon the edge of a jar. With such a core a part of the body of the electrode will pass through the perforation 3, whereby the core becomes in a manner riveted to the electrode proper, while the tapering shape of the core also prevents the loosening of the same; but, as has been stated above, I am not confined to the use of the construction shown, nor do I herein claim this particular construction, which I have already claimed in my application, Serial No. 334,260, filed December 19, 1889.

Having now fully described my invention, I claim and desire to secure by Letters Patent—

1. A secondary-battery electrode consisting, essentially, of a mixture of oxide of lead, plaster-of-paris, and sulphuric acid, substantially as described.

2. A secondary-battery electrode consisting, essentially, of a hardened mixture of red oxide of lead, plaster-of-paris, and sulphuric acid, substantially as described.

3. A secondary-battery electrode consisting, essentially, of a hardened mixture of seventy-five per cent. of red lead, twenty-five per cent. of plaster-of-paris, and sulphuric acid, substantially as described.

In testimony whereof I have signed my name to this specification in the presence of two subscribing witnesses.

JAMES F. McLAUGHLIN.

Witnesses:
WILSON R. KER,
H. F. REARDON.